(12) United States Patent
Uno et al.

(10) Patent No.: US 8,454,276 B2
(45) Date of Patent: Jun. 4, 2013

(54) CUTTING INSERT AND CUTTING TOOL

(75) Inventors: Kazuyuki Uno, Iwaki (JP); Naoto Nishiya, Iwaki (JP); Kouichi Furuya, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 0 days.

(21) Appl. No.: 13/455,007

(22) Filed: Apr. 24, 2012

(65) Prior Publication Data

US 2012/0207554 A1   Aug. 16, 2012

Related U.S. Application Data

(63) Continuation of application No. PCT/JP2010/070626, filed on Nov. 18, 2010.

(30) Foreign Application Priority Data

Nov. 20, 2009   (JP) ................... 2009-264603

(51) Int. Cl.
*B23C 5/20*   (2006.01)
(52) U.S. Cl.
CPC ........................ *B23C 5/20* (2013.01)
USPC .................. 407/42; 407/61; 407/113
(58) Field of Classification Search
USPC .............. 407/42, 55, 61, 113, 114, 115, 116
IPC ................................. B23C 5/20; B23B 27/16
See application file for complete search history.

(56) References Cited

U.S. PATENT DOCUMENTS

| 2003/0170079 A1 | 9/2003 | Daiguji et al. |
| 2007/0189861 A1* | 8/2007 | Muren et al. .................. 407/113 |
| 2010/0221076 A1* | 9/2010 | Takahashi et al. .............. 407/42 |

FOREIGN PATENT DOCUMENTS

| JP | 2001-322029 | 11/2001 |
| JP | 2005-291139 | 4/2007 |
| JP | 2007-283467 | 11/2007 |
| JP | 2009-125842 | 6/2009 |

OTHER PUBLICATIONS

International Preliminary Report on Patentability (IPRP) dated May 31, 2012 issued in PCT counterpart application (No. PCT/UP2010/070626) with translation.
International Search Report in PCT/JP2010/070626, Jan. 11, 2011.
Official Action dated May 15, 2012 issued in Japanese counterpart application (No. 2011-541956) with translation.

* cited by examiner

*Primary Examiner* — Daniel Howell
*Assistant Examiner* — Alan Snyder
(74) *Attorney, Agent, or Firm* — Womble Carlyle

(57) ABSTRACT

A cutting insert has a substantially polygonal shape, and a groove formed in a corner portion of one polygonal surface, and at an intersecting portion between a leading cutting edge and a peripheral cutting edge formed at intersecting portions of side surfaces adjacent to each other across the corner portion, a minor cutting edge is formed. Of the groove, in an area associated with the leading cutting edge and the minor cutting edge, a rake face including a downward inclined surface is formed. A first angle between a direction of maximum inclination of the downward inclined surface and the leading cutting edge is larger than a second angle between the direction of maximum inclination and the minor cutting edge.

17 Claims, 16 Drawing Sheets

CUTTING INSERT AND CUTTING TOOL

CROSS-REFERENCE TO RELATED APPLICATIONS

This is a Continuation application of International Application No PCT/JP2010/070626, filed Nov. 18, 2010 and published as WO 2011/062245A1, which claims the benefit of Japanese Patent Application No. 2009-264603, filed Nov. 20, 2009. The aforementioned applications are incorporated by reference in their entirety.

BACKGROUND OF THE INVENTION

1. Field of the Invention

The present invention relates to a cutting insert adapted to cut the inner wall surface of a prepared hole in a workpiece and a cutting tool on which the cutting insert is installed.

2. Description of the Related Art

There have been proposals for cutting inserts used for what is called boring to cut the inner wall surface of a prepared hole in a workpiece to form a machined hole and cutting tools with such cutting inserts installed thereon. In connection with such cutting inserts and tools, a technique for reducing the roughness of the inner wall surface of the machined hole is disclosed in Japanese Patent Laid-Open No. 2007-283467.

The cutting insert described in Japanese Patent Laid-Open No. 2007-283467 is characterized by being externally shaped like a polygonal flat plate and including two polygonal surfaces and a side surface lying orthogonally to the two polygonal surfaces, and in that cutting edges are provided at respective crossing ridge portions between each of the polygonal surfaces and the side surface, corner rounded portions are formed in respective corners of the polygonal surface, and between each of the corner rounded portions and at least one of a pair of the cutting edges intersecting at the corner portion, a linear edge inclined more inward than the one cutting edge is formed in a plan view of the polygonal surface.

Furthermore, the cutting tool described in Japanese Patent Laid-Open No. 2007-283467 includes the cutting insert removably installed thereon and adapted to cut an internal wall surface of a prepared hole in a workpiece using the cutting edges of the cutting insert, thus forming a machined hole, and is characterized by including a tool body that is rotated around an axis, a recess formed in an outer periphery of a leading end portion of the tool body, and a mounting seat formed backward of the recess in a tool rotating direction, and in that the cutting insert is installed in such a manner that one of the polygonal surfaces of the cutting insert is directed forward in the tool rotating direction, that one of the corner portions projects outward in a radial direction of the tool body and toward the leading end of the tool body, and that the linear edge is directed outward in the radial direction of the tool body.

The following are described concerning the cutting insert described in Japanese Patent Laid-Open No. 2007-283467. In the polygonal surface of the cutting insert, a breaker groove recessed in the polygonal surface and extending along marginal ridge portions of the polygonal surface and a rib portion partitioning the breaker groove and extending from a central portion of the polygonal surface toward each of the marginal ridge portions are formed. The breaker groove includes an inclined surface formed therein and inclined in such a manner that the inclined surface retracts gradually from a part of the polygonal surface in which the breaker groove is formed as the distance from the corner portion increases as seen in a plan view of the side surface, and at the crossing ridge portion between the inclined surface and the side surface the cutting edge is formed. Thus, even when the cutting insert is installed such that a relief angle is provided for its surface directed outward in the radial direction of the tool body so as to serve as a peripheral relief, the radial rake angle of a major cutting edge directed toward the leading end of the tool body can be set to a positive side. This allows the major cutting edge to cut better to significantly reduce cutting resistance, thus preventing the tool body from vibrating to allow cutting to be accurately achieved. The cutting insert can also be prevented from being damaged. Furthermore, since the major cutting edge cuts better, a machined surface resulting from cutting has more appropriate surface roughness.

However, in the cutting insert described in Japanese Patent Laid-Open No. 2007-283467, at the linear edge directed outward in the radial direction of the tool body, the angle (wedge angle) between the side surface (relief face) and the inclined surface (rake face) formed in the breaker groove decreases, thus significantly reducing cutting edge strength of the linear edge. Hence, the linear edge may be chipped or become defective early, precluding the surface roughness of the inner wall surface of the machined hole from being kept in an appropriate condition for a long time.

SUMMARY OF THE INVENTION

The present invention has been developed to solve the above-described problems. An object of the present invention is to provide a cutting insert suitable for machining the inner wall surface of a prepared hole in a workpiece and a cutting tool on which the cutting insert is installed.

A first aspect of the present invention is a cutting insert shaped like a substantially polygonal plate and comprising a corner portion of at least one of the polygonal surfaces and a groove formed at a marginal ridge portion extending from the corner portion, the groove being recessed from the one polygonal surface to another polygonal surface, the cutting insert comprising:

a leading cutting edge formed at an intersecting ridge portion between the groove and a leading relief face formed on at least one side surface extending between the opposite polygonal surfaces;

a peripheral cutting edge formed at an intersecting ridge portion between the groove and a peripheral relief face formed on another side surface adjacent to the side surface serving as the leading relief face; and a minor cutting edge formed at an intersecting portion between the leading cutting edge and the peripheral cutting edge as seen in a plan view of the polygonal surface, the minor cutting edge intersecting the peripheral cutting edge at an obtuse angle and connected to the groove, wherein the groove comprises a rake face including a downward inclined surface gradually approaching the another polygonal surface as a distance from the leading cutting edge increases, at least in an area, which is close to the corner portion, associated with the leading cutting edge and the minor cutting edge, and a first angle α between a direction of a maximum inclination of the downward inclined surface and a direction along the leading cutting edge is larger than a second angle β between the direction of the maximum inclination and a direction along the minor cutting edge.

A second aspect of the present invention is a cutting tool on which the cutting insert according to the first aspect of the present invention is removably mounted at a leading peripheral portion of a tool body, the cutting tool boring an inner wall surface of a prepared hole formed in a workpiece, wherein the cutting insert is installed on the tool body in such a manner that the one polygonal surface is directed forward in a tool rotating direction, the corner portion projects toward a leading end of the tool body in a direction of a center line and outward in a radial direction, the leading cutting edge and minor cutting edge extending from the corner portion project from a leading surface and an peripheral surface of the tool body, respectively, and the minor cutting edge extends substantially parallel to the center line, furthermore, at least an axial rake angle of a part of a rake face which is adjacent to an area of the leading cutting edge which is close to the corner portion is larger than a radial rake angle of a part of the rake face which is adjacent to the minor cutting edge.

The present invention can provide a cutting insert suitable for machining the inner wall surface of the prepared hole in a workpiece and a cutting tool on which the cutting insert is installed.

Further features of the present invention will become apparent from the following description of exemplary embodiments (with reference to the attached drawings).

DETAILED DESCRIPTION

Figure 1:
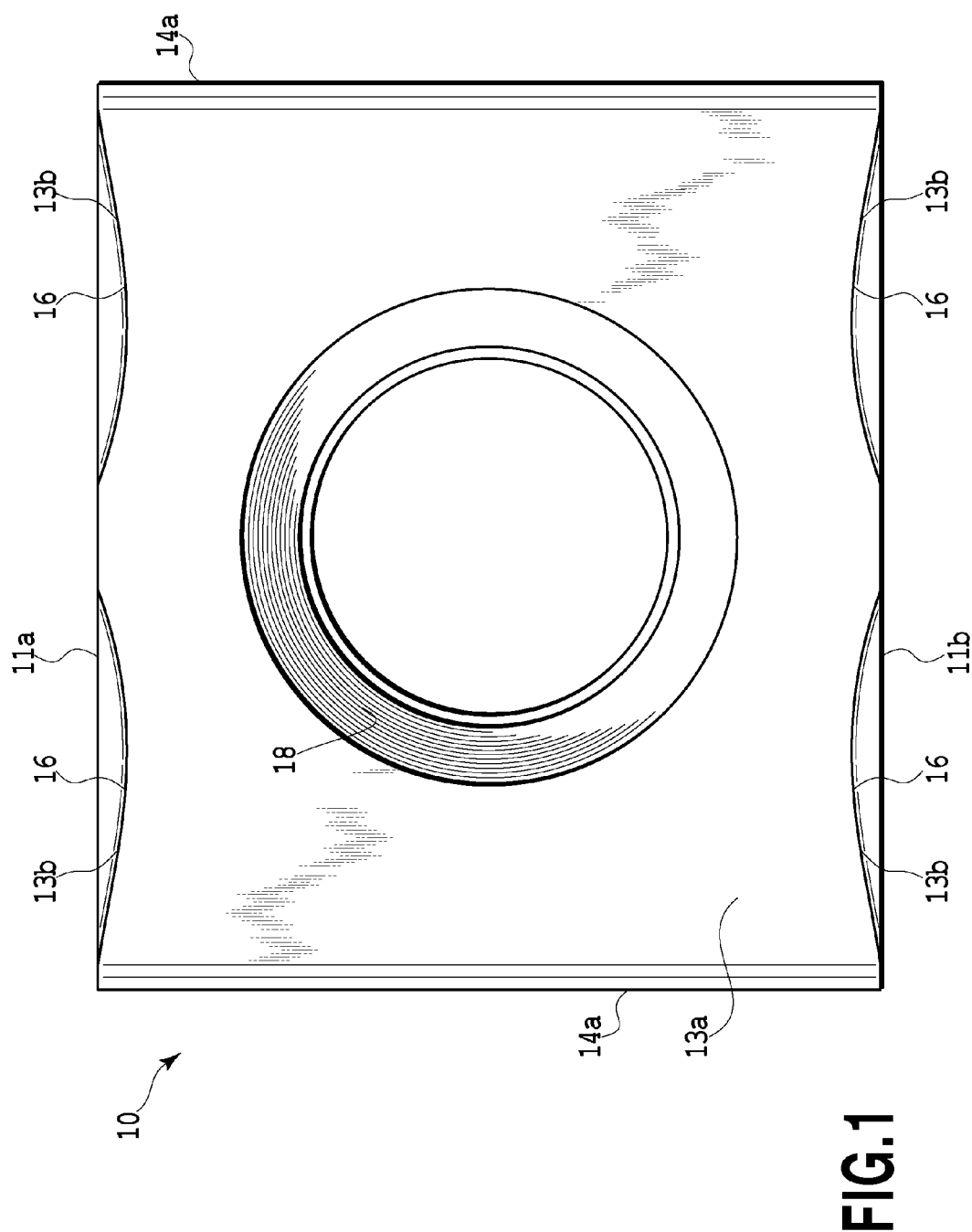
FIG. 1 is a front view of a cutting insert according to an embodiment of the present invention.
Figure 2:
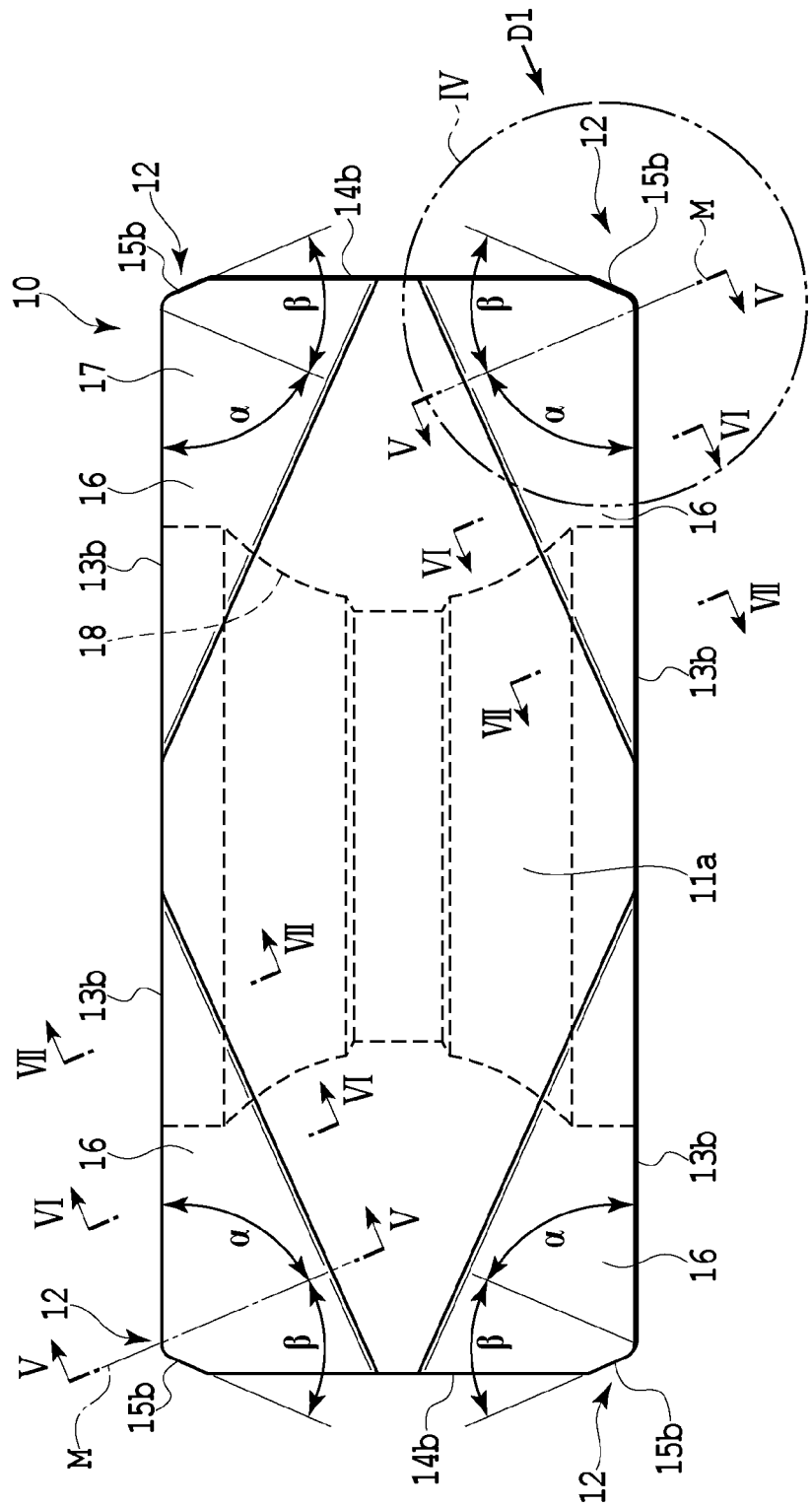
FIG. 2 is a plan view of the cutting insert shown in FIG. 1.
Figure 3:
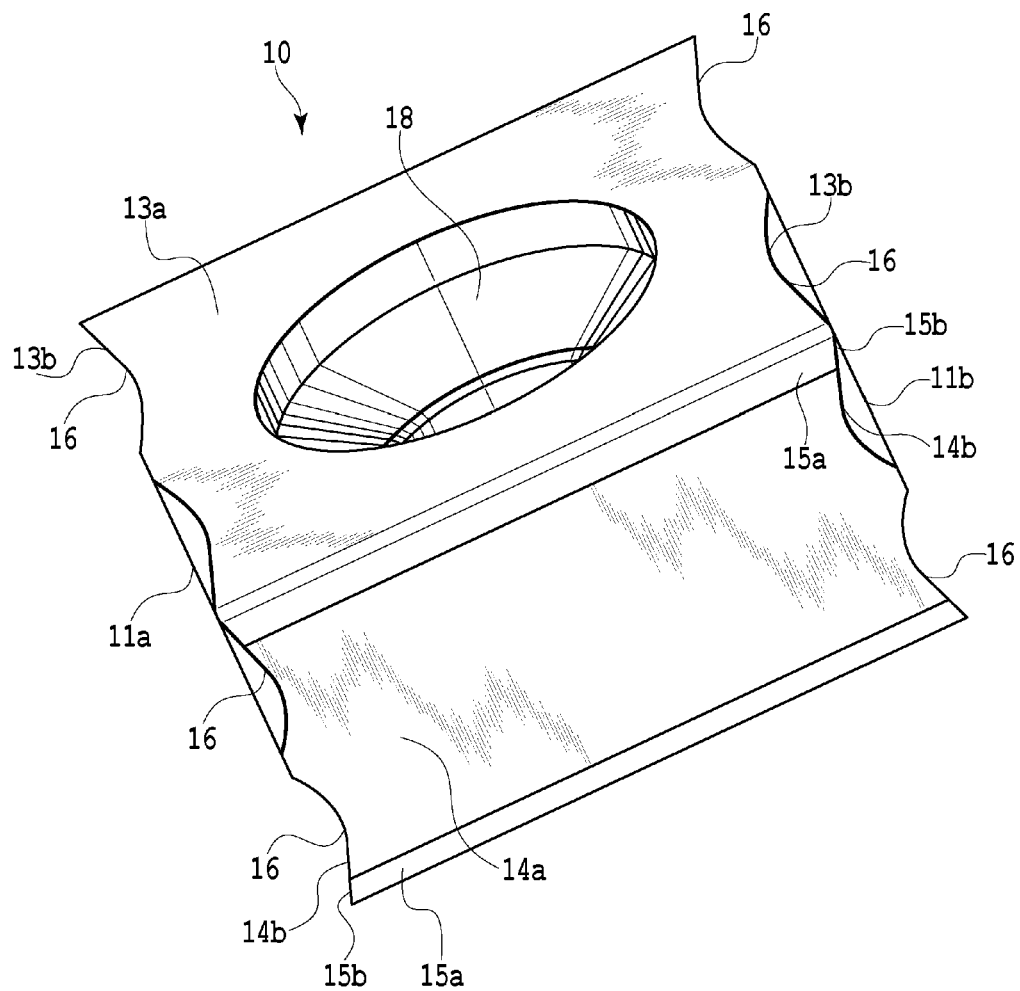
FIG. 3 is a perspective view as seen from a direction of the arrow D1 in FIG. 2.
Figure 4:
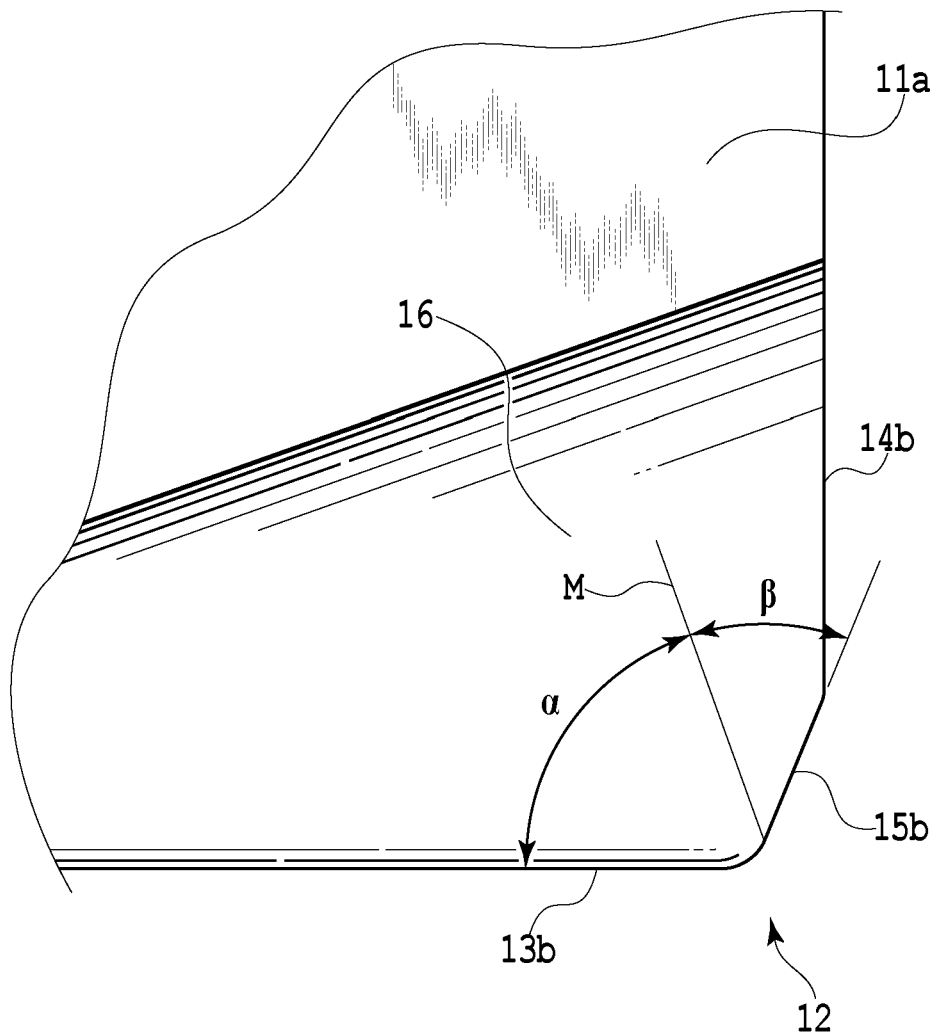
FIG. 4 is an enlarged view of a portion IV in FIG. 2.

A cutting insert 10 according to an embodiment of the present invention will be described below with reference to the drawings. As shown in FIG. 1 to FIG. 3, the cutting insert 10 is shaped like a substantially rectangular plate and includes grooves 16 formed in at least one of an upper surface 11a and a lower surface 11b each formed of the rectangular surface.

As shown in FIG. 2, the grooves 16 formed in the upper surface 11a are each shaped like a substantial triangle with a corresponding corner portion 12 located at a vertex thereof as seen in a plan view of the upper surface 11a. The groove 16 is formed to intersect both the upper surface 11a and a pair of side surfaces adjacent to each other across the corner portion 12. In the present embodiment, the groove 16 is formed in four corner portions 12 of the upper surface 11a and four corner portions 12 of the lower surface 11b. That is, the groove 16 is formed in all of the eight corner portions 12 of the upper and lower surfaces. The paired grooves 16 located in the respective diagonal corner portions of each of the upper surface 11a and the lower surface 11b are in a rotationally symmetric relationship. The paired grooves 16 located in the adjacent corner portions 16 are in a linearly symmetric relationship. The grooves 16 formed in the upper surface 11a include groove wall surfaces depressed toward the opposite lower surface 11b.

A leading relief face 13a is formed on a side surface formed of a relatively large rectangular surface substantially orthogonal to the upper and lower surfaces 11a and 11b at long side portions of the upper and lower surfaces 11a and 11b. A peripheral relief face 14a is formed on a side surface formed of relatively small rectangular surfaces substantially orthogonal to the upper and lower surfaces 11a and 11b at short side portions of the upper and lower surfaces 11a and 11b. Moreover, as shown in FIG. 3, a chamfer-like minor relief face 15a is formed at an intersection portion between the leading relief face 13 and the peripheral relief face 14a, which are adjacent to each other. The minor relief face 15a and the peripheral relief face 14a intersect at an obtuse angle, and in the present embodiment, at an angle of 155°. Leading cutting edges 13b are each formed at an intersecting ridge portion between the corresponding groove 16 and the corresponding leading relief face 13a. Peripheral cutting edges 14b are each formed at an intersecting ridge portion between the corresponding groove 16 and the corresponding peripheral relief face 14a. Minor cutting edges 15b are each formed at a intersecting ridge portion between the corresponding groove 16 and the corresponding minor relief face 15a. In this case, at each of the long side portions of the upper surface 11a and the lower surface 11b, the paired leading cutting edges 13b extending from two corner portions of the long side portion respectively are formed. One of the paired leading cutting edges 13b is used as a right hand cutting edge, whereas the other leading cutting edge 13b is used as a left hand cutting edge.

In an area, which is close to the corner portion 12, associated with the leading cutting edge 13b and the minor cutting edge 15b, the groove 16 which is adjacent to the area includes a rake face 17 with a downward inclined surface 16a that gradually approaches the lower surface 11b as the distance from the leading cutting edge 13b toward the inside of the cutting insert increases and an upward inclined surface 16b located inside and connected to the downward inclined surface 16a and gradually approaching the upper surface 11a as the distance from the leading cutting edge 13b increases. As shown in FIG. 2, the direction M of the maximum inclination of the downward inclined surface is inclined to a direction along the leading cutting edge 13b and a direction along the minor cutting edge 15b. The first angle $\alpha$ between the direction M of the maximum inclination and the direction along the leading cutting edge 13b is larger than the second angle $\beta$ between the direction M of the maximum inclination and the direction along the minor cutting edge 15b. In the present embodiment, the first angle α is 65°, and the second angle β is 45°.

Figure 5:
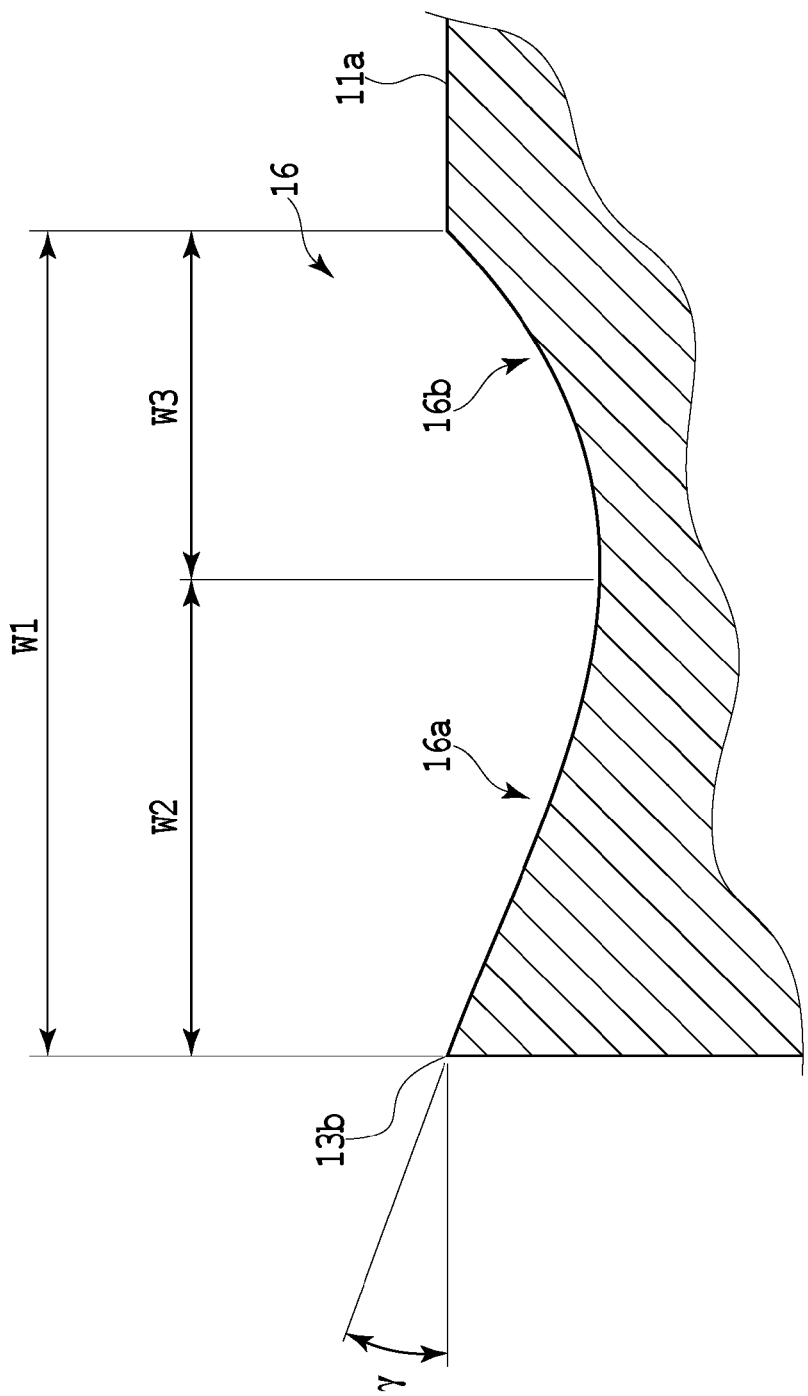
FIG. 5 is an enlarged cross-sectional view taken along line V-V in FIG. 2.
Figure 6:
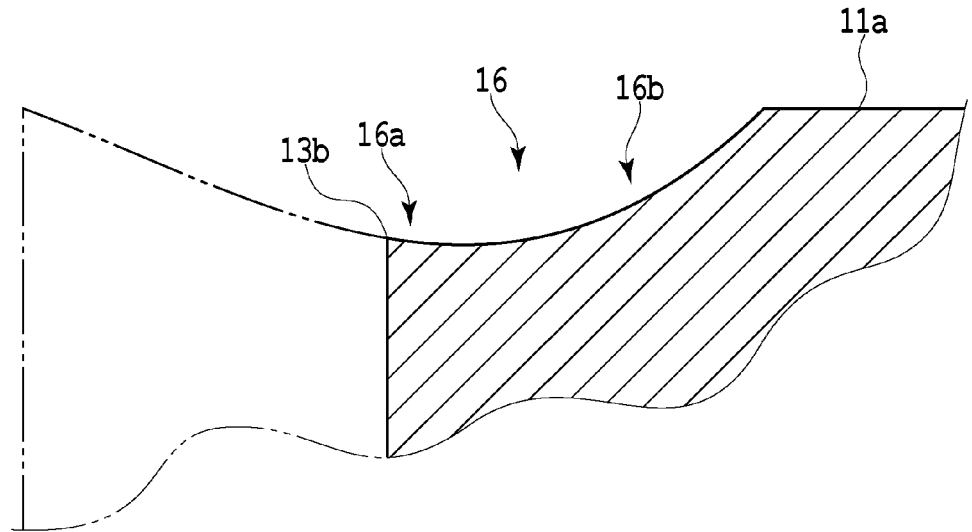
FIG. 6 is an enlarged cross-sectional view taken along line VI-VI in FIG. 2.
Figure 7:
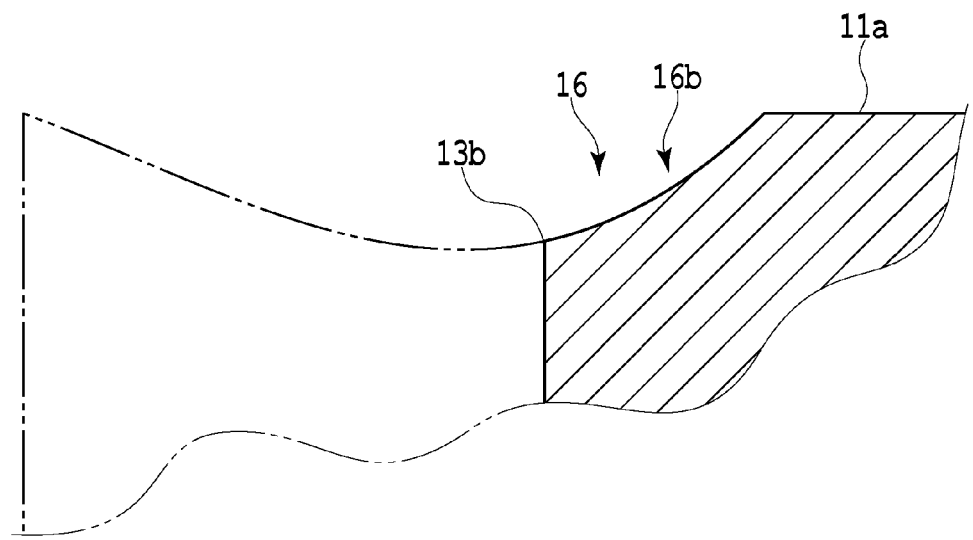
FIG. 7 is an enlarged cross-sectional view taken along line VII-VII in FIG. 2.

As shown in FIG. 5, in a cross section taken along a plane located at the intersection portion between the leading cutting edge 13b and the minor cutting edge 15b and extending along a direction parallel to the direction M of the maximum inclination of the downward inclined surface of the groove and perpendicular to the upper and lower surfaces 11a and 11b (the cross section is taken along line V-V), the downward inclined surface 16a includes a plane formed in an area adjacent to the leading cutting edge 13b and the minor cutting edge 15b and a curved surface located inside and connected to the plane. The third angle γ between the plane and the upper surface 11a, that is, the inclination angle γ of the plane to the upper surface 11a, is positive, and in the present embodiment, is set to 20°. The cross sectional shape of the groove 16 is basically as shown in FIG. 5. As seen in FIG. 2, the groove 16 extends along a direction oblique to the leading cutting edge 13b. Thus, in the cross sectional shape of the groove 16 as observed in a cross section parallel to a cross section taken along line V-V, the position on the leading cutting edge 13b gradually retracts toward the inside of the cutting insert as the distance from the corner portion 12 increases in the direction along the leading relief face 13b. Hence, the cross sectional shape of the groove 16 varies with the position on the leading cutting edge 13b. That is, as is understood from FIG. 5 to FIG. 7, as the distance from the corner portion 12 increases in the direction along the leading relief face 13a, the downward inclined surface 16a and the upward inclined surface 16b decrease gradually sequentially with respect to the basic cross sectional shape of the groove 16 shown in FIG. 5. Finally, the groove 16 disappears. A virtual cross sectional shape shown by a dashed line in FIG. 6 and FIG. 7 shows the basic cross sectional shape illustrated in FIG. 5. In an area adjacent to the minor cutting edge 15b, the downward inclined surface 16a, formed of the plane, is formed to keep the minor cutting edge 15b linear in shape.

As shown in FIG. 5, the width W1 of the groove decreases gradually with increasing distance from the corner portion 12 along the leading cutting edge 13b and finally becomes zero. Similarly, the width W2 of the downward inclined surface of the groove decreases gradually with increasing distance from the corner portion 12 along the leading cutting edge 13b, and becomes zero at an intermediate portion of the leading cutting edge 13b. The rake angle at the intermediate portion is almost 0°. The width W3 of the upward inclined surface of the groove, from the intermediate portion as a starting point, decreases gradually as the distance from the corner portion 12 increases, and becomes zero at the position where the groove 16 disappears.

The above-described configuration of the groove 16 also applies to the grooves 16 formed in the lower surface 11b.

In a central portion of each of paired side surfaces formed of large rectangular surfaces each forming the leading relief face 13a, a mounting hole 18 is formed to pass through the side surfaces in a direction perpendicular to the side surfaces.

A substantially rhombic plane remains in the central portion of each of the upper surface 11a and the lower surface 11b corresponding to the entire surface 11a or 11b except for the grooves 16 formed therein. Each of paired apexes of the rhombic plane which forms an acute angle reaches an intermediate portion of the peripheral cutting edge 14b. Each of paired apexes of the rhombic plane which forms an obtuse angle reaches an intermediate portion of the leading cutting edge 13b. The rhombic plane is located at a level equal to or higher than that of the leading cutting edge 13b, the peripheral cutting edge 14b, and the minor cutting edge 15b, and serves as a seating face that comes into abutting contact with an insert mounting seat 22 provided on a tool body 20 of a cutting tool.

Figure 8:
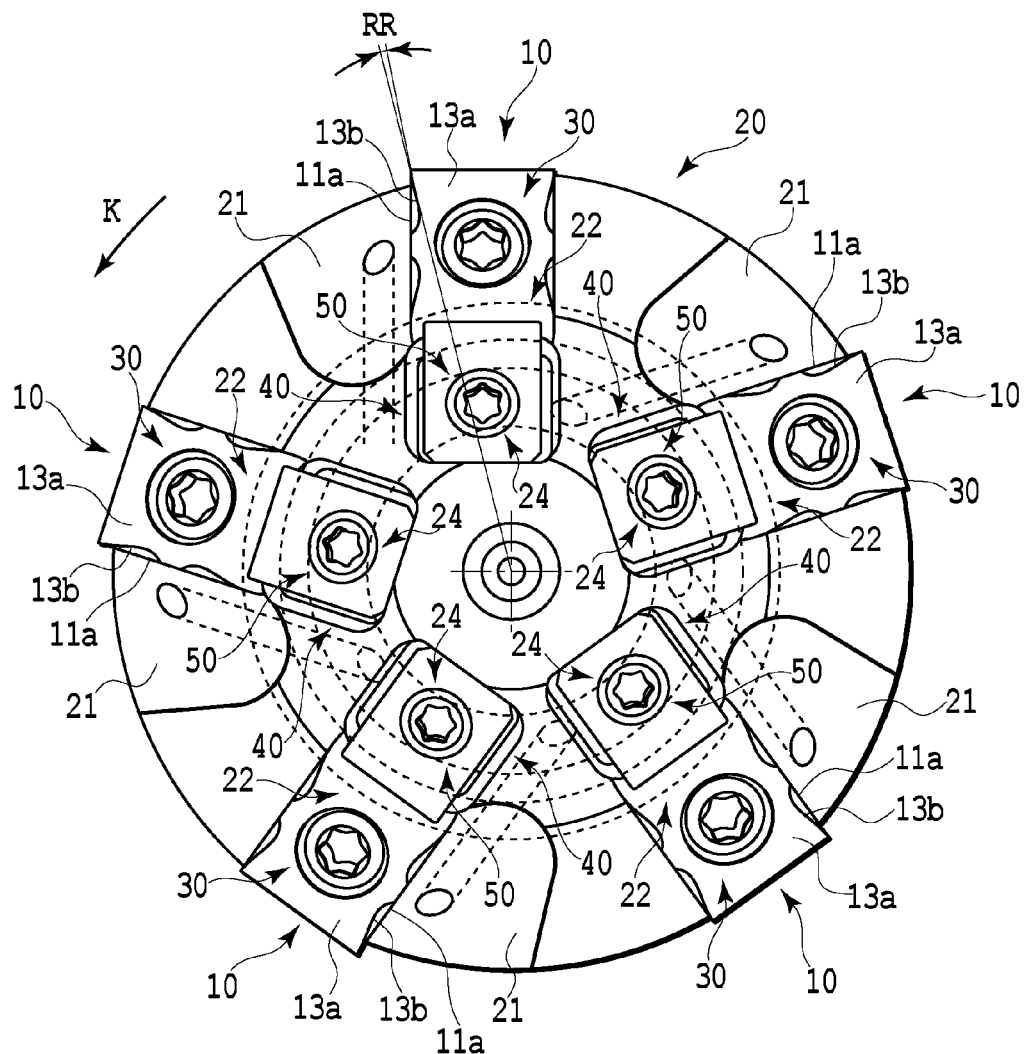
FIG. 8 is a diagram of a cutting tool on which the cutting insert shown in FIG. 1 is installed as seen from a leading end side of the cutting tool in the direction of a center line.
Figure 9:
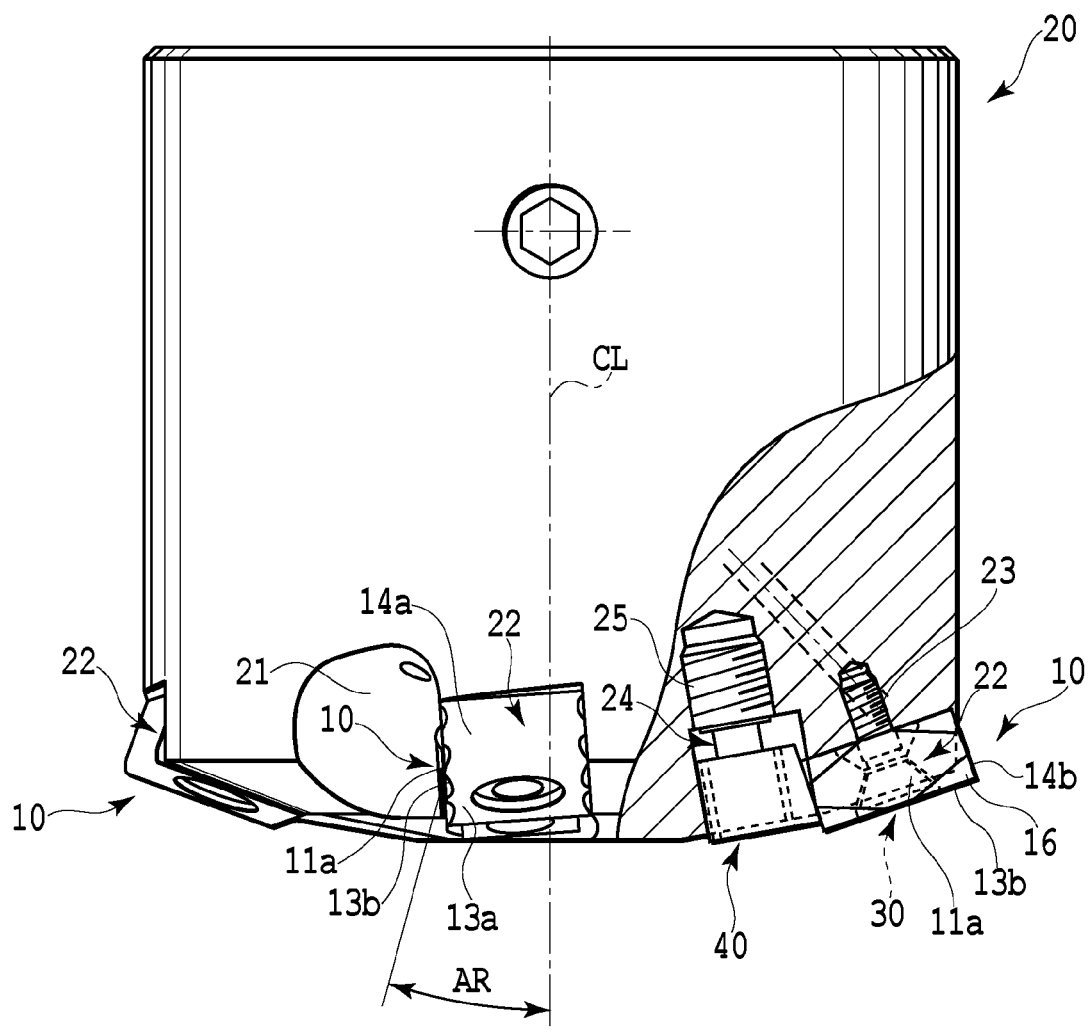
FIG. 9 is a diagram of the cutting tool shown in FIG. 8, including a cross section of a part of the cutting tool as seen from a direction orthogonal to the center line.

A cutting tool on which the above-described cutting insert 10 is installed is shown in FIG. 8 and FIG. 9. In the cutting tool, the cutting insert 10 is removably installed, with an insert fixing screw, on the insert mounting seat 22 formed on an peripheral portion of the leading end of the tool body 20 that is rotated around a center line CL. The tool body 20 is formed of a substantially cylindrical steel material or the like. Engagement holes for coupling to a holder (not shown in the drawings) are formed at a base end of the tool body 20.

Chip pockets 21 formed of recesses to open in the leading surface and peripheral surface of the tool body 20 are formed in a leading peripheral portion of the tool body 20. In the cutting tool according to the present embodiment, the chip pocket 21 is formed at five positions at substantially equal intervals along a circumferential direction of the tool body 20.

The insert mounting seat 22, on which the cutting insert 10 is mounted, is formed backward of each of the chip pockets 21 in a tool rotating direction K. A bottom surface of the insert mounting seat 22 which is directed toward a leading end of the tool is an inclined plane such that the distance toward a base end of the tool decreases consistently with the distance toward the outside of the tool in the radial direction thereof. An internal threaded hole 23 is formed in the bottom surface so that an insert fixing screw 30 is screwed into the internal threaded hole 23. The cutting insert 10 is mounted on the insert mounting seat 22 so that the upper surface 11a is directed forward in the tool rotating direction K, that the leading relief face 13a is directed toward the leading end of the tool, and that the peripheral relief face 14a is directed outward in a radial direction of the tool. The cutting insert 10 is removably installed on the insert mounting set 22 by inserting the insert fixing screw 30 through the mounting hole 18 formed in the central portion of the leading relief face 13a directed toward the leading end of the tool and screwing the insert fixing screw 30 into the internal threaded hole 23 formed in the bottom surface of the insert mounting seat 22.

In the cutting insert 10 installed on the insert mounting seat 22, the leading cutting edge 13b extends almost parallel to the bottom surface of the insert mounting seat 22 and is inclined to a plane orthogonal to the center line CL of the tool body so that the distance toward the base end of the tool decreases consistently with the distance toward the outside of the tool in the radial direction thereof. Furthermore, the peripheral cutting edge 14b is inclined to the center line CL of the tool body so as to extend inward in the radial direction of the tool as the distance toward the base end of the tool decreases. The corner portion 12 projects from the leading peripheral portion of the tool body 20. The leading cutting edge 13b and the minor cutting edge 15b each extending from the corner portion 12 project from the leading end surface and peripheral surface of the tool body 20, respectively. Moreover, the minor cutting edge 15b extends almost parallel to the center line CL.

As shown in FIG. 8, the upper surface 11a of the cutting insert 10 is disposed to project forward in the tool rotating direction K with respect to a straight line joining the center of the tool body 20 with the corner portion 12 of the upper surface 11a, as the cutting tool is seen from the leading end thereof. That is, the cutting insert 10 is arranged so that the upper surface 11a thereof has a negative radial rake angle. On the other hand, an area of the leading cutting edge 13b which is close to the corner portion 12, in other words, an area of the cutting tool which lies outside the leading cutting edge in the radial direction, is inclined backward in the tool rotating direction K with respect to the upper surface 11a. The radial rake angle RR of this area lies on a more positive side than that of the upper surface 11a.

On the other hand, as shown in FIG. 9, when the cutting tool is seen from a direction orthogonal to the center line CL so that the peripheral relief face 14a of the cutting insert 10 is seen at the front, the upper surface 11a of the cutting insert 10 is arranged to be inclined so that the tool base end side thereof projects more forward in the tool rotating direction K than the tool leading end thereof. That is, the cutting insert 10 is arranged so that the upper surface 11a thereof has a negative axial rake angle. On the other hand, a rake face area formed by the downward inclined surface 16a of the groove and located adjacent to the leading cutting edge 13b and the minor cutting edge 15 is inclined backward in the tool rotating direction K with respect to the upper surface 11a. The axial rake angle AR of the rake face area lies on a more positive side than that of the upper surface 11a. In the present embodiment, the axial rake angle AR of the plane is larger than 0°.

A fine-tuning wedge insertion groove 24 is formed inward of the insert mounting seat 22 in the radial direction of the tool and adjacent to the insert mounting seat 22. A fine-tuning wedge 40 is shaped like a substantial rectangle as seen from the leading end of the tool body 20. The fine-tuning wedge 40 is installed in the fine-tuning wedge insertion groove 24 by screwing a fine-tuning wedge fixing screw 50 threadingly engaging an internal threaded hole passing through the rectangular surfaces, into an internal threaded hole 25 formed in a bottom surface of the fine-tuning wedge insertion groove 24. The fine-tuning wedge 40 is installed so that a wedge surface thereof directed outward in the radial direction of the tool comes into abutting contact with the side surface of the cutting insert 10 directed inward in the radial direction of the tool. When the fine-tuning wedge fixing screw 50 is screwed into the internal threaded hole 25 formed in the bottom surface of the fine-tuning wedge insertion groove 24, the fine-tuning wedge 40 moves closer to the bottom surface. In conjunction with the movement, the wedge surface of the fine-tuning wedge 40 presses the side surface of the cutting insert 10 outward in the radial direction of the tool. Thus, the cutting insert 10 moves outward in the radial direction of the tool along the bottom surface of the insert mounting seat 22. Consequently, the distance from the center of the tool body 20 to the minor cutting edge 15b of the cutting insert 10 increases.

The above-described cutting tool is rotated around the center line CL and fed along a prepared hole in a workpiece. Then, the leading cutting edge 13b of the cutting insert 10 positioned closer to the leading end of the tool mainly cuts the inner wall surface of the prepared hole. Furthermore, the minor cutting edge 15b located outward of and adjacent to the leading cutting edge 13b in the radial direction of the tool finishes the inner wall surface of the machined hole.

Since the minor cutting edge 15b extends substantially parallel to the center line CL of the tool body, the inner wall surface of the machined hole is smoothly formed parallel to the center line CL and has very appropriate surface roughness. The peripheral cutting edge 14b, located adjacent to the minor cutting edge 15b and closer to the base end of the tool than the minor cutting edge 15b, is gradually inclined inward in the radial direction of the tool as the distance toward the base end of the tool decreases. This suppresses contact with the inner wall surface of the machined hole to enable a reduction in cutting resistance.

If one of the corner portions 12 of the cutting insert 10 which is involved in cutting is worn away, the corner portion 12 is changed to another one, which is then used for cutting.

The present embodiment uses the paired corner portions 12 located at diagonal positions of each of the upper surface 11a and the lower surface 11b to make four corners available, thus improving economic efficiency. Although not shown in the drawings, installation of the cutting insert on a left-hand cutting tool makes four more corners available, further improving economic efficiency.

In the cutting insert 10, at least in an area, which is close to the corner portion 12, associated with the leading cutting edge 13b and the minor cutting edge 15b, the first angle α between the direction M of the maximum inclination of the downward inclined surface of the groove adjacent to the above-described adjacent area and the direction along the leading cutting edge 13b is larger than the second angle β between the direction M of the maximum inclination and the direction along the minor cutting edge 15b. Thus, the following are both positive: the inclination angle of the downward inclined surface 16a in a cross section orthogonal to the leading cutting edge 13b and the inclination angle of the downward inclined surface 16a in a cross section orthogonal to the minor cutting edge 15b. That is, when the first angle α is larger than the second angle β, the rake angles of the rake face 17 are both positive. Furthermore, setting the direction M of the maximum inclination as described above makes the rake angle of the leading cutting edge 13b larger than that of the minor cutting edge 15b. Hence, when the cutting insert 10 is installed on the cutting tool, at least the axial rake angle of a part of the rake face 17 which is adjacent to an area of the leading cutting edge 13b which is close to the corner portion 12 is positive. This enables the cutting insert to cut better, reducing the cutting resistance.

On the other hand, since the rake angle of the minor cutting edge 15b is set smaller than that of the leading cutting edge 13b, the cutting edge strength of the minor cutting edge 15b is prevented from decreasing. Thus, the minor cutting edge 15b is prevented from being rapidly worn away, being chipped, or becoming defective. This allows the surface roughness of the inner wall surface of the machined hole to be kept in the appropriate condition for a long time.

With an increase in the difference between the first angle α between the direction M of the maximum inclination of the downward inclined surface of the groove and the direction along the leading cutting edge 13b and the second angle β between the direction M of the maximum inclination and the direction along the minor cutting edge 15b, the rake angle of the leading cutting edge 13b desirably increases to prevent the cutting edge strength of the minor cutting edge 15b from decreasing.

In the present cutting insert 10, the downward inclined surface 16a of the groove, which is adjacent to the minor cutting edge 15b, is formed of a plane, thus keeping the minor cutting edge 15b linear in shape. Thus, the smoothness of the inner wall surface of the hole processed by the minor cutting edge 15b is prevented from being adversely affected. Furthermore, even if the minor cutting edge 15b is formed to be curved, the smoothness of the inner wall surface of the machined hole is prevented from being adversely affected because the minor cutting edge 15b remains curved.

As described above, in a cross section taken along a plane orthogonal to the direction M of the maximum inclination of the downward inclined surface 16a of the groove, the cross-sectional shape of the groove 16 varies in the direction along the leading cutting edge 13b. In an area of the leading cutting edge 13b which is close to the corner portion 12, the rake face 17 formed of the downward inclined surface 16a ensures a positive rake angle. This serves to reduce the cutting resistance. Furthermore, in the area close to the corner portion 12, the groove 16 is relatively large in width in the direction orthogonal to the leading cutting edge 13b. This enables chips to be smoothly discharged.

On the other hand, in an area of the leading cutting edge 13b which is located away from the corner portion 12 and formed only of the upward inclined surface 16b, the cutting edge strength is increased to allow prevention of notch wear that is likely to occur at a cutting boundary portion. Furthermore, as the distance from the corner portion 12 increases, the rake angle decreases and the upward inclined surface 16b approaches the leading cutting edge 13b. This facilitates deformation of chips resulting from contact with the upward inclined surface 16a. Thus, the chips are subjected to bending moment in the width direction thereof (the direction along the leading cutting edge 13b) and are easily separated from one another. As a result, the chips are appropriately discharged.

In the cutting tool according to the present embodiment, operation of the fine-tuning wedge 40 allows variation of the distance from the center of the tool body 20 to the minor cutting edge 15b of the cutting insert 10. Thus, the inner diameter dimension of the machined hole can be fine-tuned as required without the need to change the size of the cutting insert 10 or to change the tool body 20. Consequently, processing accuracy can be improved. Furthermore, the distance from the center of the tool body 20 to the minor cutting insert 15b of the cutting insert can be made almost equal among the cutting inserts. This makes the burden on the minor cutting edge 15b equal among the cutting inserts, reducing a variation in damage to the cutting insert. As a result, the life of the cutting insert is increased.

In the cutting insert 10 installed on the cutting tool, the thickness between the upper and lower surfaces 11a and 11b directed in the tool rotating direction K is larger than that between the paired side surfaces serving as the leading relief face 13a. In the cutting insert 10 installed on the cutting tool, the direction faced by the upper and lower surfaces 11a and 11b with the relatively large thickness between the surfaces 11a and 11b corresponds to the tool rotating direction K. This increases the strength of the cutting insert 10 in the direction of cutting force of the cutting resistance, preventing the cutting insert 10 from being damaged.

Another embodiment with the present invention applied thereto will be described below with reference to the drawings. The same components of the present embodiment as those of the above-described embodiment are denoted by the same reference numerals and will not be described below in detail.

As shown in FIG. 10 to FIG. 13, a cutting insert 10 according to the present embodiment is shaped like a substantially square plate, and includes an upper surface 11a and a lower surface 11b formed of paired square surfaces and grooves 16 formed in eight corner portions 12 of the upper and lower surfaces 11a and 11b.

Figure 14:
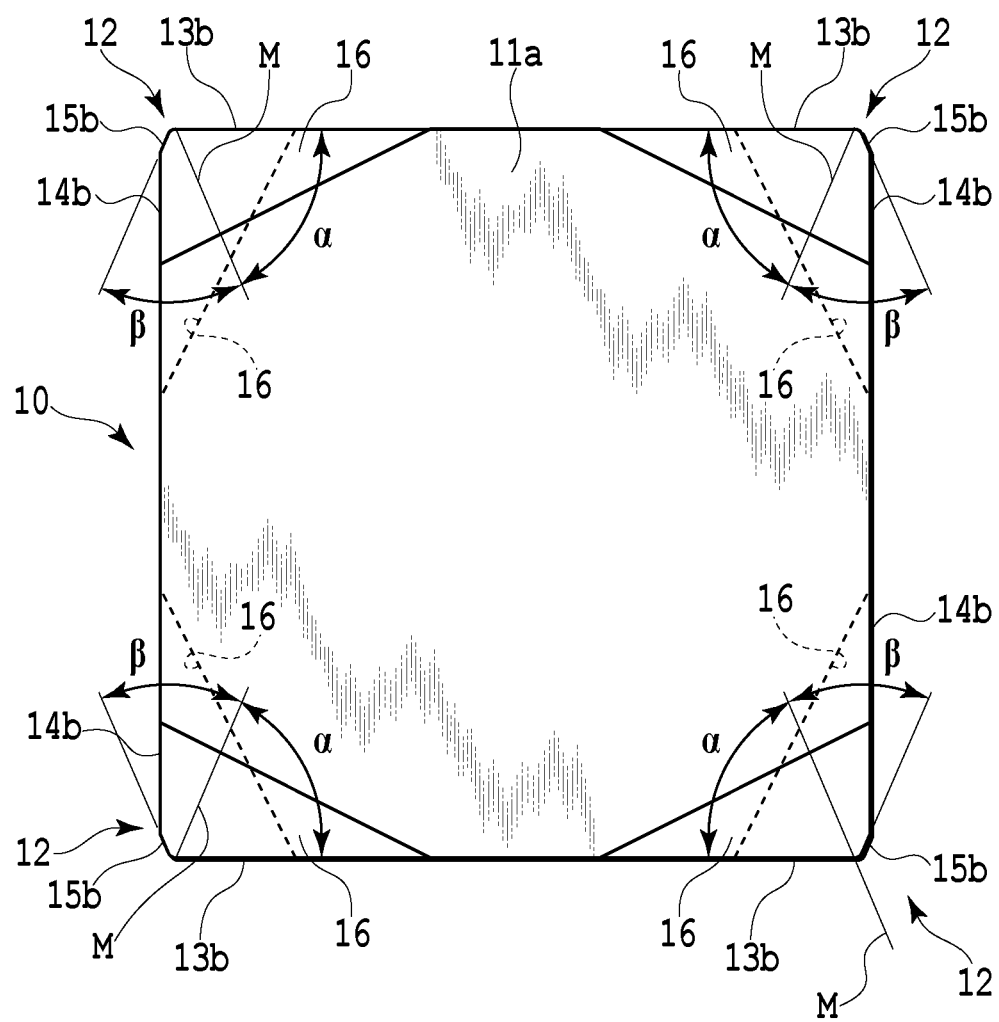
FIG. 14 is a front view illustrating a variation of the cutting insert according to the another embodiment of the present invention.
Figure 15:
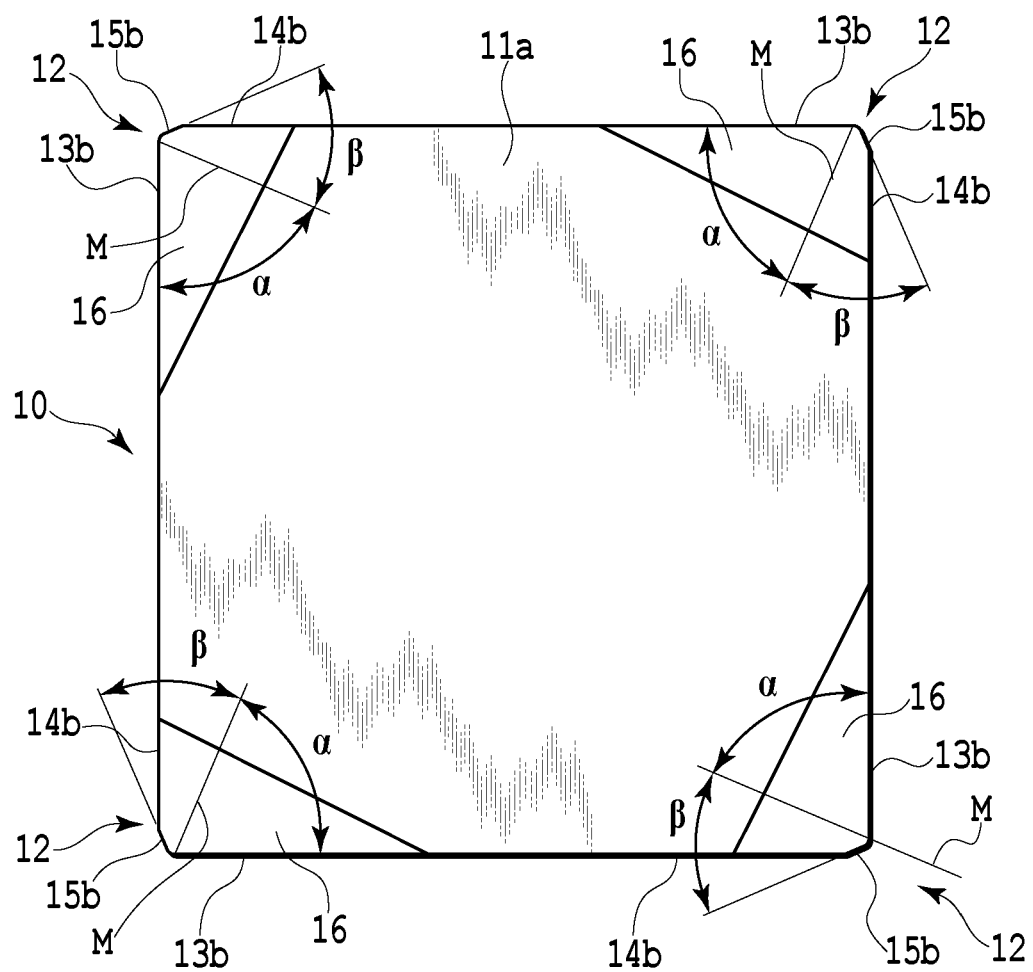
FIG. 15 is a front view illustrating another variation of the cutting insert according to the another embodiment of the present invention.

When each of the upper and lower surfaces 11a and 11b has a shape symmetric with respect to bisectors in the corner portion thereof as in the case of the present cutting insert 10, then between the set of grooves 16 formed in the upper surface 11a and the set of grooves 16 formed in the lower surface 11b, the phase may be shifted by 90° with respect to the center of the upper and lower surfaces 11a and 11b, as shown in FIG. 14. In this case, a large seating face is formed on a back side of a leading cutting edge 13b of the upper surface 11a in a direction along the leading cutting edge 13b. Thus, the cutting insert 10 can be more stably seated. Furthermore, as illustrated in FIG. 15, the grooves 16 formed in the upper surface 11a or the lower surface 11b may be formed to be rotationally symmetric with respect to the center line of the cutting insert 10. In this case, the leading cutting edges 13b are all adapted for the same hand cutting insert (FIG. 15 shows a left hand cutting insert as an example). Only one leading cutting edge 13b is formed at one marginal ridge portion of the upper surface 11a or the lower surface 11b. Thus, the present cutting insert can be made smaller than a cutting insert with two leading cutting edges 13b formed at one marginal ridge portion.

As described above, in the present cutting insert 10, in connection with the relationship between the upper surface 11a and the lower surface 11b (front surface and back surface) or the adjacent corner portions, the arrangement of the grooves 16 may be changed as needed. The specific configurations of the relief faces 13a, 14a, and 15a, the cutting edges 13b, 14b, and 15b, and the grooves 16 are similar to those described in the above-described embodiment and will thus not be described below.

Figure 10:
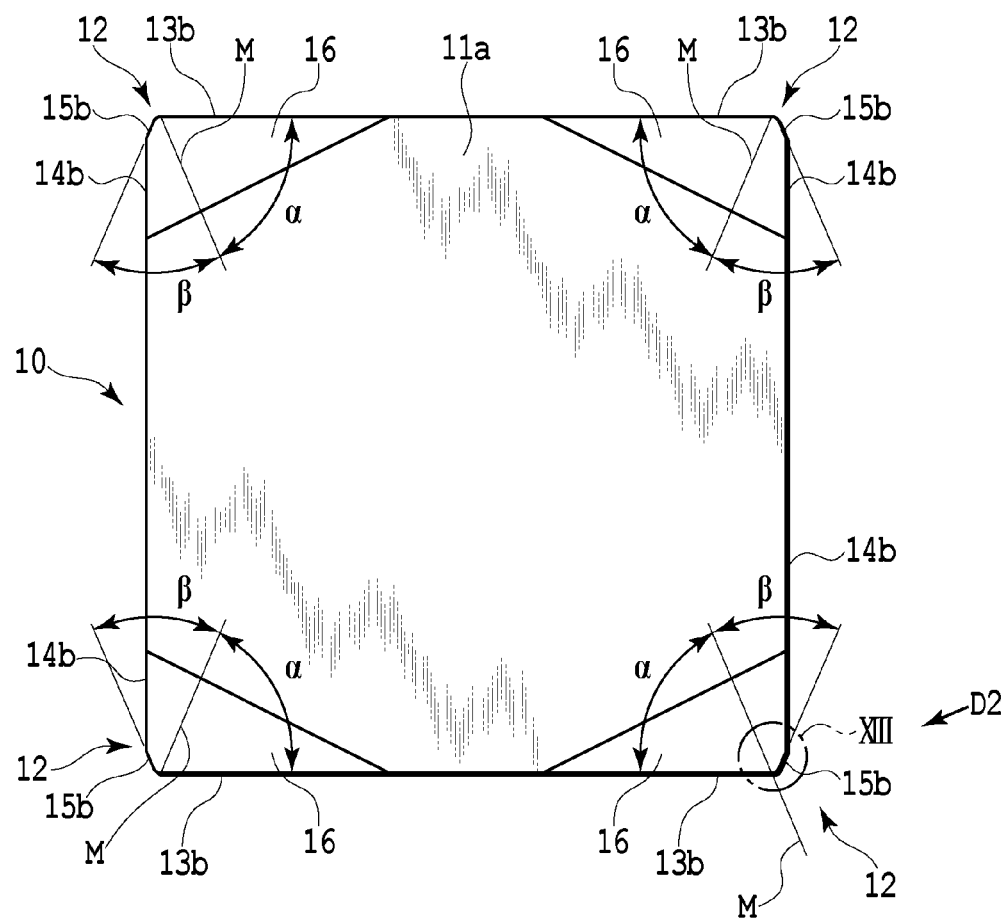
FIG. 10 is a front view of a cutting insert according to another embodiment of the present invention.
Figure 11:
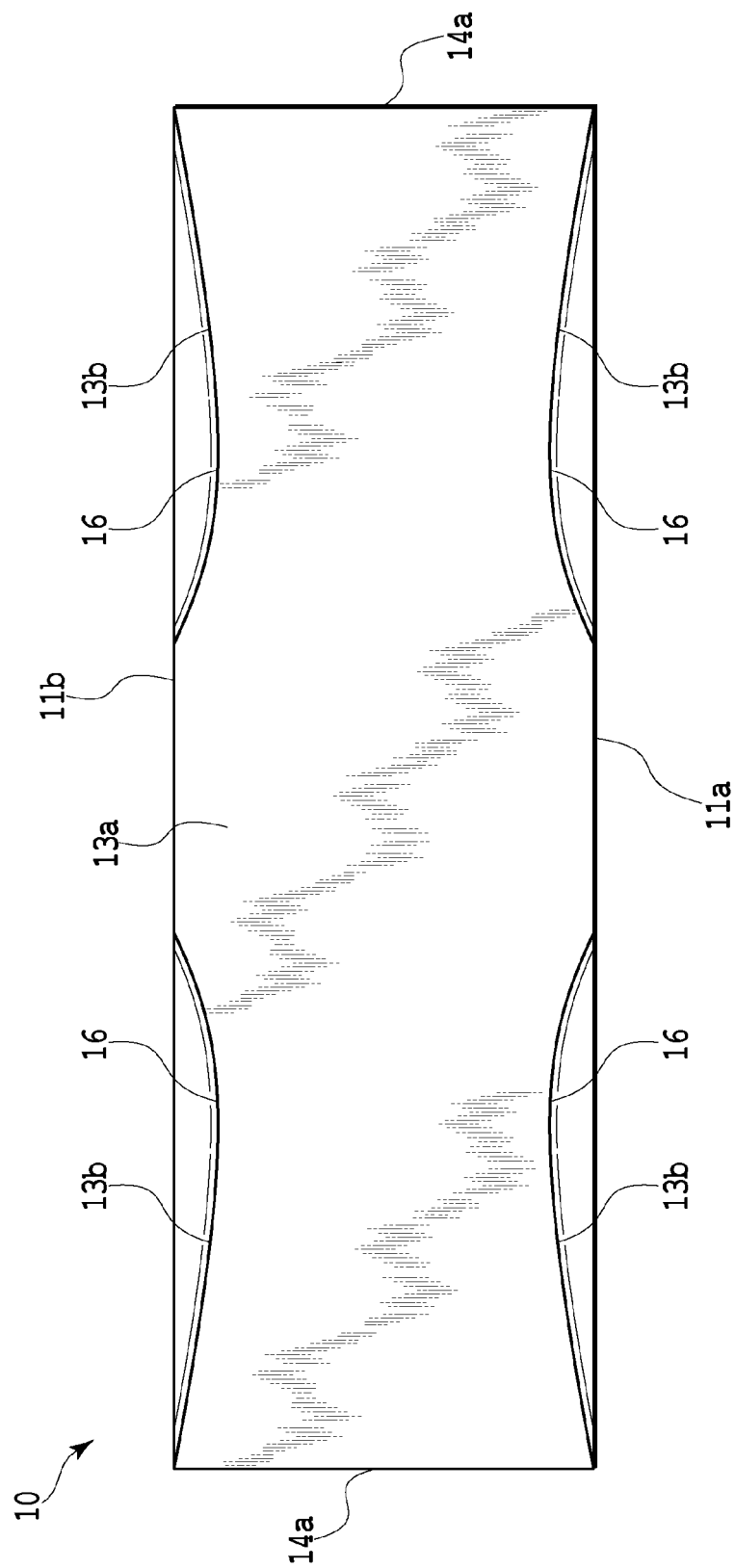
FIG. 11 is a plan view of the cutting insert shown in FIG. 10.
Figure 12:
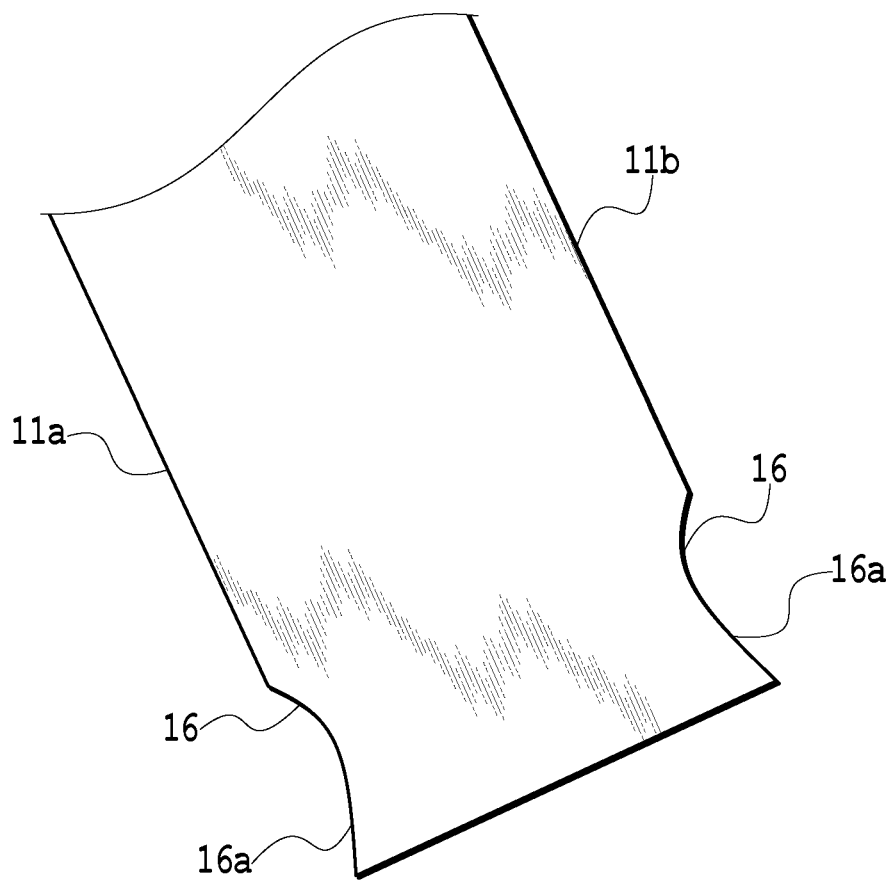
FIG. 12 is a diagram as seen from a direction of the arrow D2 in FIG. 10.
Figure 13:
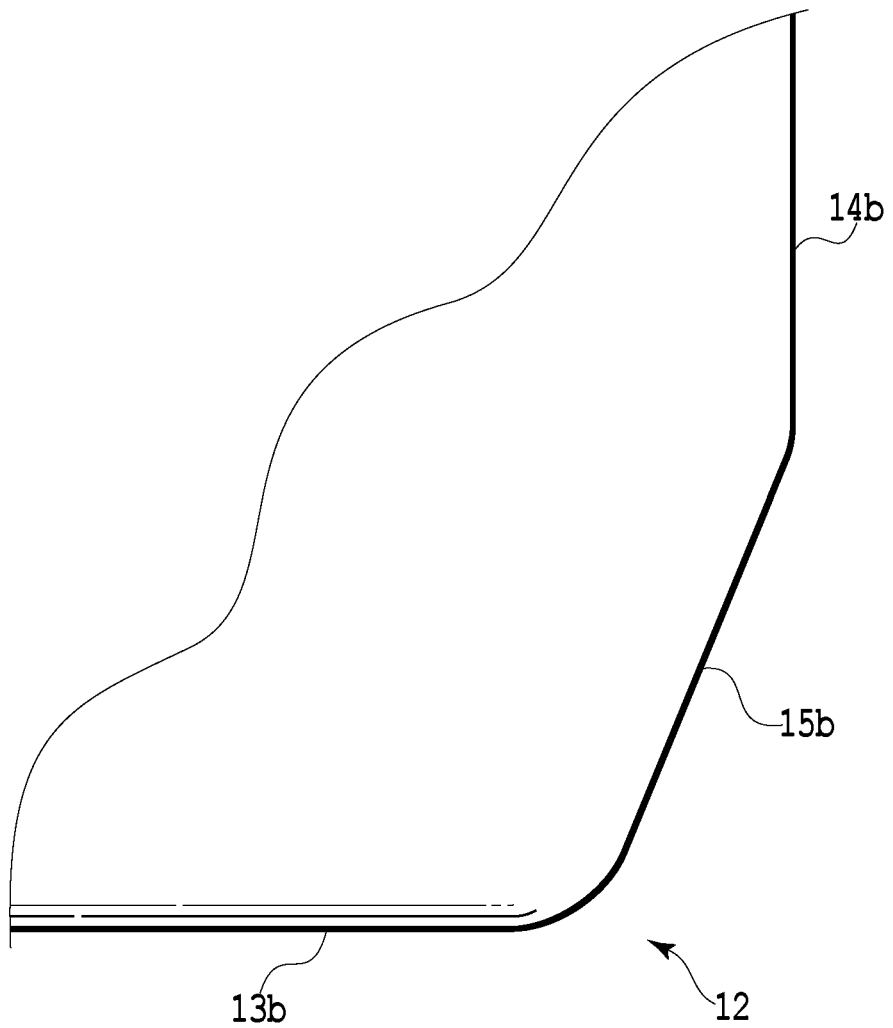
FIG. 13 is an enlarged view of a portion XIII in FIG. 10.
Figure 16:
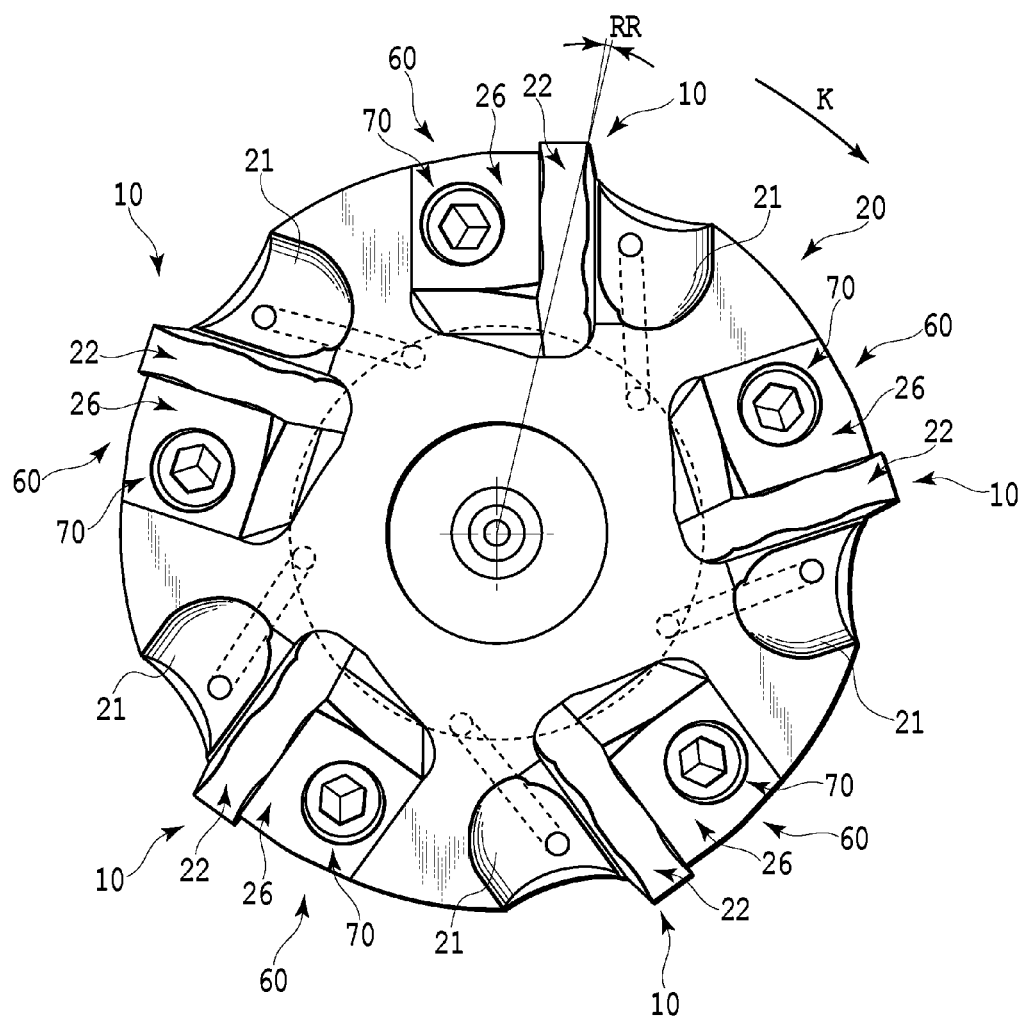
FIG. 16 is a diagram of a cutting tool on which the cutting insert shown in FIG. 10 is installed as seen from a leading end side of the cutting tool in the direction of a center line.
Figure 17:
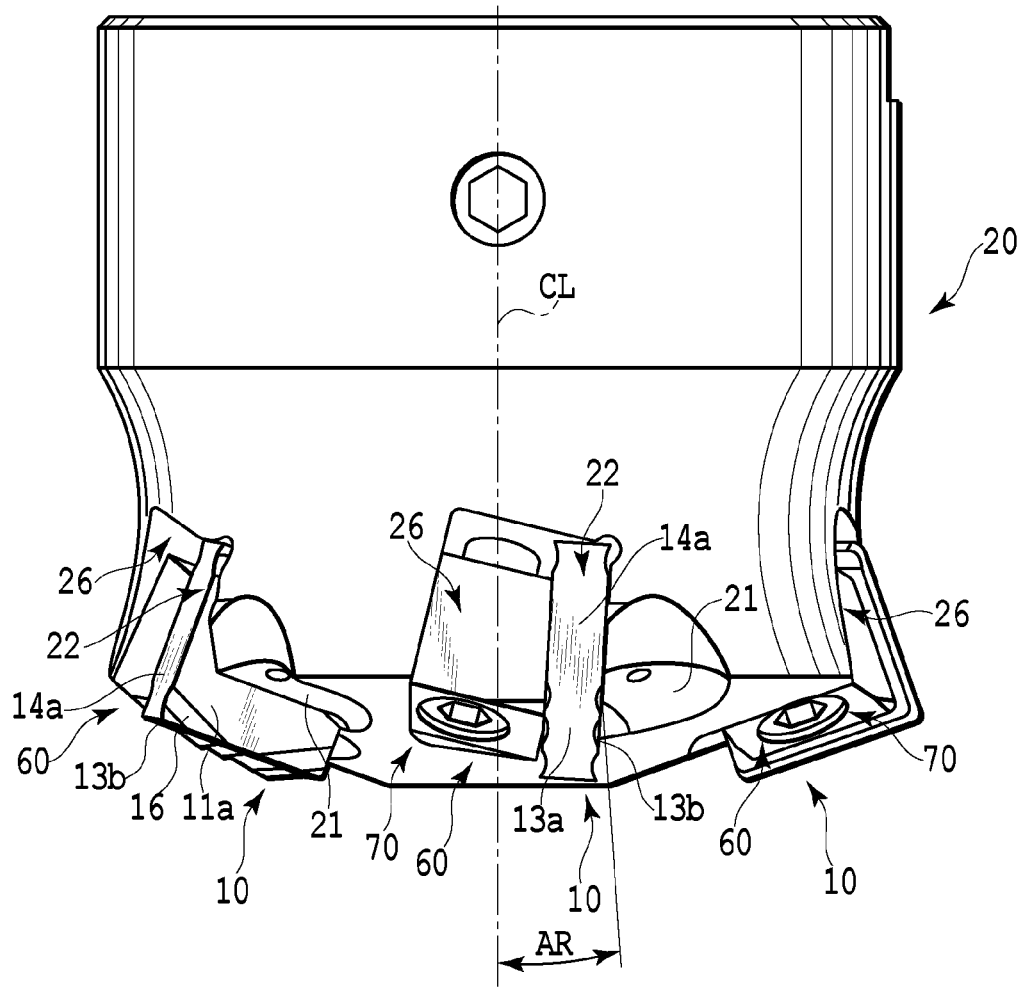
FIG. 17 is a diagram of the cutting tool shown in FIG. 16, as seen from a direction orthogonal to the center line.

A cutting insert 10 with no mounting hole formed therein is removably fixed to a tool body utilizing a fixing wedge. That is, as shown in FIGS. 16 and 17, a fixing wedge insertion groove 26 is formed adjacent to the insert mounting seat 22 and backward of the insert mounting groove 22 in the tool rotating direction K. A fixing wedge 60 is attached in the fixing wedge insertion groove 26 utilizing a fixing wedge fixing screw 70. Screwing the fixing wedge fixing screw 70 causes the fixing wedge 60 to move toward a bottom surface of fixing wedge insertion groove 26. A wedge surface thereof presses the lower surface 11a of the cutting insert 10 toward a wall surface of an insert mounting seat (forward in the tool rotating direction K), thus removably fixing the cutting insert 10. The cutting tool according to the present embodiment is a left hand type but may of course be changed to a right hand type. A cutting insert 10 with both right and left hand cutting edges as shown in FIG. 10 need not be changed when the cutting tool is changed from a right hand type to a left hand type or vice versa.

The present invention is not limited to the above-described embodiments. It goes without saying that, changes, deletions, and additions of constituents may be allowed without departing from the main point of the present invention.

For example, for the shape of the cutting insert 10, the present invention is applicable to any cutting insert shaped like a substantially polygonal plate such as a substantially triangle plate, a substantially parallelogrammatic plate, a substantially rhombic plate, a substantially pentagonal plate, or a substantially hexagonal plate. Furthermore, for the arrangement of the grooves, the grooves may be formed in at least one of the upper surface 11a and lower surface 11b of the cutting insert 10 and in at least one corner portion.

What is claimed is:

1. A cutting insert shaped like a substantially polygonal plate and comprising a corner portion of at least one of the polygonal surfaces and a groove formed at a marginal ridge portion extending from the corner portion, the groove being recessed from the one polygonal surface to another polygonal surface, the cutting insert comprising:

a leading cutting edge formed at an intersecting ridge portion between the groove and a leading relief face formed on at least one side surface extending between the opposite polygonal surfaces;

a peripheral cutting edge formed at an intersecting ridge portion between the groove and a peripheral relief face formed on another side surface adjacent to the side surface serving as the leading relief face; and a minor cutting edge formed at an intersecting portion between the leading cutting edge and the peripheral cutting edge as seen in a plan view of the polygonal surface, the minor cutting edge intersecting the peripheral cutting edge at an obtuse angle and connected to the groove, wherein the groove comprises a rake face including a downward inclined surface gradually approaching the another polygonal surface as a distance from the leading cutting edge increases, at least in an area, which is close to the corner portion, associated with the leading cutting edge and the minor cutting edge, and a first angle ($\alpha$) between a direction of a maximum inclination of the downward inclined surface and a direction along the leading cutting edge is larger than a second angle ($\beta$) between the direction of the maximum inclination and a direction along the minor cutting edge.

2. The cutting insert according to claim 1, wherein the leading cutting edge has a inclined portion to be inclined so as to decline gradually toward the another polygonal surface as a distance from the corner portion increases.

3. The cutting insert according to claim 1, wherein at least an area of the downward inclined surface of the groove, which area is connected to the minor cutting edge, is formed of a plane.

4. A rotary cutting tool on which the cutting insert according to claim 1 is removably mounted at a leading peripheral portion of a tool body, the cutting tool configured to bore an inner wall surface of a prepared hole formed in a workpiece, wherein the cutting insert is installed on the tool body in such a manner that the one polygonal surface is directed forward in a tool rotating direction, the corner portion projects toward a leading end of the tool body in a direction of a rotating central axis and outward in a radial direction, the leading cutting edge and minor cutting edge extending from the corner portion project from a leading surface and an peripheral surface of the tool body, respectively, and the minor cutting edge extends substantially parallel to the rotating central axis, and wherein at least an axial rake angle of a part of a rake face which is adjacent to an area of the leading cutting edge close to the corner portion is larger than a radial rake angle of a part of the rake face which is adjacent to the minor cutting edge.

5. The cutting tool according to claim 4, wherein at least the axial rake angle of the part of the rake face which is adjacent to the area of the leading cutting edge close to the corner portion is positive.

6. A cutting insert comprising:

a substantially polygonal plate having opposing first and second polygonal surfaces connected by a plurality of side surfaces, the cutting insert comprising a plurality of corner portions, each corner portion formed at an intersection of the first polygonal surface with two adjacent side surfaces, each corner portion being associated with:

a groove formed at a marginal ridge portion extending from said each corner portion, the groove being recessed from the first polygonal surface in a direction of the second polygonal surface;

a leading cutting edge formed at an intersecting ridge portion between the groove and a leading relief face formed on a first side surface;

a peripheral cutting edge formed at an intersecting ridge portion between the groove and a peripheral relief face formed on a second surface adjacent to the first side surface; and a minor cutting edge formed at an intersecting portion between the leading cutting edge and the peripheral cutting edge as seen in a plan view of the first polygonal surface, the minor cutting edge intersecting the peripheral cutting edge at an obtuse angle and connected to the groove, wherein the groove comprises a rake face having a downward inclined surface which extends in a direction of the second polygonal surface with increasing distance from the leading cutting edge, at least in an area where the leading cutting edge joins with the minor cutting edge, and in a plan view of the first polygonal surface, a first angle ($\alpha$) between a direction of a maximum inclination of the downward inclined surface and a direction along the leading cutting edge, is larger than a second angle ($\beta$) between the direction of the maximum inclination and a direction along the minor cutting edge.

7. The cutting insert according to claim 6, wherein the leading cutting edge has an inclined portion which extends in a direction of the second polygonal surface, with increasing distance from its associated corner portion.

8. The cutting insert according to claim 6, wherein at least an area of the downward inclined surface of the groove, which area is connected to the minor cutting edge, is formed of a plane.

9. The cutting insert according to claim 6, comprising a mounting hole extending between opposing side surfaces.

10. The cutting insert according to claim 6, wherein the cutting insert is devoid of a mounting hole.

11. The cutting insert according to claim 6, wherein the cutting insert has 180° rotational symmetry, but not 90° rotational symmetry, in a plan view of the first polygonal surface.

12. The cutting insert according to claim 6, wherein the cutting insert has 90° rotational symmetry in a plan view of the first polygonal surface.

13. The cutting insert according to claim 6, wherein first and second polygonal surfaces are identical.

14. The cutting insert according to claim 6, wherein the first and second polygonal surfaces both are provided with left handed and right handed leading cutting edges.

15. The cutting insert according to claim 6, wherein the first polygonal surface is provided with left handed leading cutting edges, and the second polygonal surface is provided with right handed leading cutting edges.

16. A rotary cutting tool on which the cutting insert according to claim 6 is removably mounted at a leading peripheral portion of a tool body, the cutting tool configured to bore an inner wall surface of a prepared hole formed in a workpiece, wherein the cutting insert is installed on the tool body in such a manner that the first polygonal surface is directed forward in a tool rotating direction, an operative corner portion projects toward a leading end of the tool body in a direction of a rotating central axis and outward in a radial direction, the leading cutting edge and minor cutting edge extending from the operative corner portion project from a leading surface and an peripheral surface of the tool body, respectively, and the minor cutting edge extends substantially parallel to the rotating central axis; and wherein at least an axial rake angle of a part of a rake face which is adjacent to an area of the leading cutting edge close to the corner portion is larger than a radial rake angle of a part of the rake face which is adjacent to the minor cutting edge.

17. The cutting tool according to claim 16, wherein at least the axial rake angle of the part of the rake face which is adjacent to the area of the leading cutting edge close to the corner portion is positive.

* * * * *